Nov. 18, 1969  O. B. CRUSE  3,479,096
CONTROL VALVE
Filed May 31, 1968
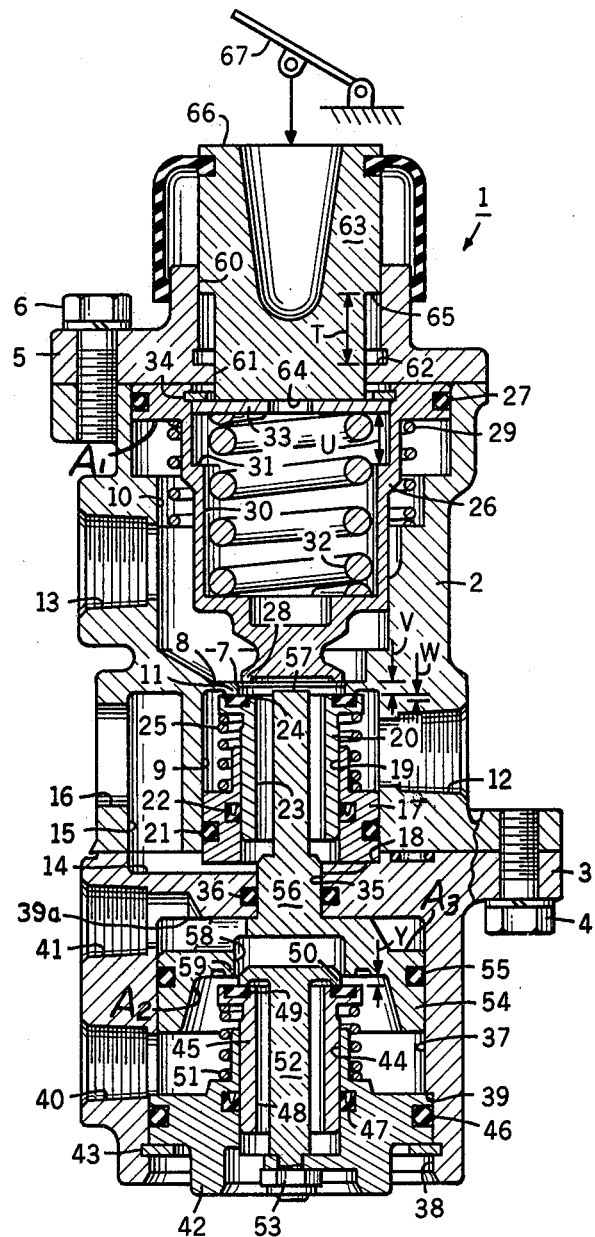
INVENTOR
OLIVER B. CRUSE
BY
Joseph E. Papin.

United States Patent Office 3,479,096
Patented Nov. 18, 1969

3,479,096
CONTROL VALVE
Oliver B. Cruse, Florissant, Mo., assignor to Wagner Electric Corporation, Newark, N.J., a corporation of Delaware
Filed May 31, 1968, Ser. No. 733,467
Int. Cl. B60t *15/04*
U.S. Cl. 303—54                                 10 Claims

ABSTRACT OF THE DISCLOSURE

A control valve having a force responsive member movable to apply service air to the service portion of a spring set braking mechanism to effect the normal service braking effort thereof and another member driven by the force responsive member upon failure of the service air to exhaust emergency air from the emergency portion of the spring set braking mechanism to effect the spring setting or emergency braking effort thereof, and means for limiting the movement of the force responsive member to controllably proportion the service and emergency braking effort of the spring set brake mechanism upon the simultaneous delivery of the service air to the service portion and the exhaustion of the emergency air from the emergency portion.

This invention relates to control valves and in particular to those for controlling the service and emergency actuation of spring set braking devices in a vehicle braking system.

In the past, control valves, such as that disclosed in United States Patent No. 3,309,149 issued Mar. 14, 1967, to Richard C. Bueler, were utilized for actuating the service and emergency portions of a spring set braking device to effect the normal service fluid pressure energization and the emergency or mechanical spring setting energization of a vehicle brake, respectively. Such past control valves were provided with an emergency member which normally effected the application of emergency fluid pressure from a source thereof to the emergency portion of the spring set braking device to maintain the emergency or spring setting mechanism thereof in a disabled or inoperative position, and such past control valves were also provided with a service member selectively movable in response to an operator applied force to apply service fluid pressure from a source thereof to the service portion of said spring set braking device and effect the normal service energization of the vehicle brakes. Under emergency vehicle operating conditions in the event of the failure of the service fluid pressure, the operator applied force on the service member was effective to drivingly engage said service member with the emergency member and thereafter concertedly drive said emergency member toward a position metering the emergency fluid pressure from the emergency portion of the spring set braking device to the atmosphere to effect actuation of the emergency or spring setting mechanism thereof to mechanically energize the vehicle brakes. When only a partial failure of the service fluid pressure occurred, actuation of the service member of the past control valves applied the partially failed service fluid pressure to the service portion of the spring set braking device to effect the service energization of the vehicle brakes, and under such emergency conditions, the operator applied force could be increased, such as during a panic stop, to overcome or override the reaction force of the service fluid pressure acting on said service member and effect full or complete actuation of the emergency member totally exhausting or dumping the emergency fluid pressure from the emergency portion of said spring set braking device to effect the maximum available mechanical energization of the vehicle brakes. One of the disadvantageous or undesirable features of such past control valves was that during the simultaneous actuation of the service and emergency members thereof when the service fluid pressure was only partially failed, the extent or intensity of the actuation of the emergency member was not limited or controlled in proportion with loss of service fluid pressure. In other words, the operator could override the reaction force of the partially failed service fluid pressure acting on the service member to effect a dumping actuation of the emergency member. Another disadvantageous or undesirable feature of such past control valves was that when the operator did override the reaction force in the service member to effect complete or substantially complete actuation of the emergency member, the output forces of the service and emergency portions of the spring set braking devices were compounded to effect a very severe or intense service and mechanical energization of the vehicle brakes which often resulted in permanent distortion and/or fracture of the vehicle brake component parts and of the interconnecting linkage between said spring set braking device and said vehicle brake.

The principal object of the present invention is to provide a control valve which overcomes the aforementioned disadvantageous or undesirable features, and this, as well as other objects and advantageous features of the present invention, will become apparent in the specification which follows.

Briefly, the present invention embodies a control valve having application means movable therein to establish fluid pressure in one flow passage, driving means for said application means, abutment means to limit movement of said driving means, said driving means being movable into engagement with said abutment means to actuate said application means and normally establish fluid pressure in said one flow passage in excess of a predetermined value, other application means driven by said first named application means upon movement thereof in excess of a predetermined amount to establish fluid pressure in another flow passage, and resilient means responsive upon the failure of the established fluid pressure in said one flow passage to a value less than the predetermined value to drivingly engage said first named application means with said other application means to establish fluid pressure in said other flow passage proportional to the difference between the predetermined value and the magnitude of the established fluid pressure in said one flow passage less than the predetermined value.

In the drawing like numerals refer to like parts wherever they occur, and said drawing is a sectional view showing a control valve embodying the present invention in cross-section.

Referring now to the drawing in detail, a control valve 1 is provided with an upper or service housing 2 and a lower or emergency housing 3 which are connected by suitable means, such as studs 4, and an end cap or housing 5 is connected to the upper end of said service housing by suitable means, such as studs 6.

The service housing 2 is provided with a bore 7 defining an annular wall or partition 8 axially positioned between a counterbore 9 and stepped counterbore 10 which respectively form a set of inlet and outlet chambers, and a valve seat 11 is defined on said wall in circumscribing relation with said bore. A service inlet port 12, which is adapted for connection with a source of service fluid pressure (not shown), is provided in the service housing 2 connecting with the counterbore 9, and a service outlet port 13, which is adapted for connection with the service portion of a spring set brake operating cylinder (not shown) of a type well known to the art and shown, for instance, in the aforementioned United States Patent No. 3,309,149, is also provided in said upper housing connecting with the counterbore 10. A recess 14 is provided in the upper portion of the emergency housing 3 beneath the counterbore 9 forming an exhaust chamber in combination with a communicating exhaust passage and port 15, 16 provided in the service housing 2. A valve guide member 17 is received in the lower end of the counterbore 9 in engagement with a shoulder 18 provided on the emergency housing 3 in the recess 14 thereof. The valve guide member 17 is provided with a bore 19 in which an inlet or service valve member 20 is slidable, and seals 21, 22 are carried by said valve guide member in sealing engagement with the counterbore 9 and said valve member, respectively. The valve member 20 is provided with an axial bore or exhaust opening 23 therethrough, and an annular sealing member or disc 24 is provided on the upper end of said valve member in circumscribing relation with said exhaust opening, said sealing member being normally urged into sealing engagement with the service housing valve seat 11 by a valve spring 25 biased between said inlet valve member and the valve guide member 17.

A service application or valve control member, such as the piston 26, is slidably received in the counterbore 10 having a peripheral seal 27 in sealing engagement with said counterbore. The service piston 26 is provided with a valve seat 28 on the lower end thereof which is coaxial with the service housing bore 7 and normally maintained in spaced relation with the valve member seal 24 by a return spring 29 biased between said piston and the service housing 2, said return spring normally urging said piston toward its inoperative position into engagement with the interior end of the end cap 5. A metering spring stepped bore 30 is provided in the piston 26 defining an annular shoulder 31 thereon, and a pre-compressed metering spring 32 is retained in said metering spring stepped bore by a retainer or force receiving plate 33 which is urged by said metering spring away from the shoulder 31 and into abutment with a snap ring and groove assembly 34 provided in the upper end of said metering spring stepped bore. The service piston 26 is also provided with an effective area $A_1$ which is subjected to the service fluid pressure at the outlet port 13, said area $A_1$ being substantially defined by the cross-sectional sealing area of the service piston seal 27 with the housing counterbore 10.

The emergency housing 3 is provided with a bore 35 having a seal 36 disposed therein, and the upper end of said bore intersects with the emergency housing recess 14 while the lower end thereof connects with stepped counterbores 37, 38. A shoulder 39 is provided on the housing 3 between the stepped counterbores 37, 38, and another shoulder 39a is also provided on said housing at the juncture of the bore 35 and counterbore 37. An emergency inlet port 40, which is adapted for connection with a source of emergency fluid pressure (not shown), is provided in the emergency housing 3 intersecting with the counterbore 37 adjacent to the shoulder 39, and an emergency outlet port 41, which is adapted for connection with the emergency portion of the aforementioned spring set brake operating cylinder (not shown), is also provided in said housing intersecting with said counterbore 37 adjacent to the shoulder 39a. A valve guide member 42 is received in the counterbore 38 in engagement with the housing shoulder 39 and retained therein against displacement by a snap ring and groove assembly 43 provided in the lower end of said counterbore. The valve guide assembly 42 is provided with a bore 44 in which an inlet or emergency valve member 45 is slidable, and seals 46, 47 are carried by said valve guide member in sealing engagement with the counterbore 38 and said inlet valve member, respectively. The valve member 45 is provided with an axial bore or exhaust opening 48 therethrough, and an annular sealing member or disc 49 is provided on the upper end of said valve member in circumscribing relation with said exhaust opening, said sealing member being normally urged into sealing engagement with a valve seat 50 by a valve spring 51 biased between said valve member and the valve guide member 42. The valve seat 50 is provided with an integral stem portion 52 which extends coaxially through the exhaust opening 48 of the valve member 45 into fixed engagement with the valve guide member 42 at 53.

An emergency application or valve control member, such as the piston 54, is slidably received in the counterbore 37 between the inlet and outlet ports 40, 41 and a peripheral seal 55 is carried in said piston in sealing engagement with said counterbore. The emergency portion 54 is provided with an integral stem portion 56 which is slidably received in the emergency housing bore 35 in sealing engagement with the seal 36 therein, and said stem portion extends coaxially into the exhaust opening 23 of the service valve member 20 having an upper or driven end 57 positioned in predetermined spaced relation with the valve seat 28 of the service piston 26 for driven engagement therewith. A centrally located passage 58 is provided through the emergency piston 54 for connection in pressure fluid communication between the inlet and outlet ports 40, 41, and a valve seat 59 is provided on said piston in circumscribing relation with said passage for operative engagement with the sealing member 49 of the valve member 45. The emergency piston 54 is also provided with opposed differential effective input and output areas $A_2$, $A_3$ for subjection to the emergency fluid pressure at the inlet and outlet ports 40, 41, and the inlet or input area $A_2$ is predeterminately greater than the outlet or output area $A_3$.

The end housing 5 is provided with stepped bores 60, 61 therethrough connecting with the counterbore 10 of the service housing 2, and a shoulder or abutment 62 is defined on said end housing between said stepped bores. A stepped driving member or piston 63 is slidably received in the stepped bores 60, 61 of the end housing 5 having a lower end 64 in driving engagement with the force receiving plate 33 of the service piston 63 and a shoulder or abutment 65 predeterminately spaced from the shoulder 62 of the end housing 5. The upper end 66 of the driving piston 63 is adapted to receive the force transmitted thereto from an operator controlled treadle shown at 67.

It should be noticed that the maximum travel T of the driving piston 63 between the driving piston shoulder 65 and the end housing shoulder 62 is greater than the sum of the travel U of the shoulder 31 and the abutment or snap ring 34 on the service piston 26 into engagement with the retainer plate 33, respectively, and the additive travel V of the service piston valve seat 28 into engagement with the service valve member 20 plus another relatively small predetermined distance or travel, indicated at W, which defines the displacement of said service valve member from the service housing valve seat 11 when said service piston is actuated to dump the service fluid pressure from the service inlet port 12 to the service outlet port 13, as discussed hereinafter. To complete the description of the control valve 1, it should also be noticed that the travel Y is defined between the valve seat 59 of the emergency piston 54 and the emergency valve member 45, and the travel T is less than the sum of the travels U, V, W and Y.

In the operation with the component parts of the control valve 1 positioned as shown in the drawing and as described hereinbefore, the emergency fluid pressure at the inlet port 40 acts on the effective area $A_2$ of the emergency piston 54 normally urging said emergency piston toward its normal operating position into engagement with the upper end wall 39a of the emergency housing 3 to disengage the emergency piston seat 59 from the valve member 45 thereby opening the connecting passage 58 for pressure fluid communication between the inlet and outlet ports 40, 41 to establish fluid pressure at the outlet port 41 having substantially the same magnitude as that at said inlet port. Since the area $A_2$ was previously defined as greater than the area $A_3$ and the emergency fluid pressure at the inlet and outlet ports 40, 41 respectively acting on the areas $A_2$, $A_3$ are substantially equal, a relatively small differential reaction force is established across the emergency piston 54 normally urging said emergency piston upwardly toward its normal operating position into engagement with the emergency housing shoulder 39a.

In the event the operator desires to effect a service application under normal vehicle operating conditions with the component parts of the control valve 1 in their original or normal operating positions as shown in the drawing and as described hereinbefore, a manually applied force from the treadle 67 on the driving piston 63 is transmitted through the retainer plate 33 and the metering spring 32 to the service piston 26 to move said service piston downwardly against the negligible force of its return spring 29. This downward movement initially moves the service piston seat 28 through the travel V into engagement with the valve member 20 closing the exhaust passage 23 thereof to isolate the outlet port 13 from the atmosphere, and further downward movement concertedly urges said valve member against the negligible compressive force of its return spring 25 toward a position disengaged from the housing valve seat 11 to establish pressure fluid communication between the inlet and outlet ports 12, 13.

The service fluid pressure flows from the inlet port 12 through the inlet chamber 9, the connecting passage 7 and the outlet chamber 10 into the outlet port 13 and therefrom to effect a normal service application of the service portion of the spring set brake device (not shown) connected therewith. When the service reaction force created by the established service fluid pressure at the outlet port 13 acting on the effective area $A_1$ of the service piston 26 equals the manually applied force, said service piston is moved upwardly compressing the metering spring 32 and disengaging the snap ring 34 from the retainer plate 33 until the valve member 20 is positioned in lapped engagement with the housing valve seat 11 and the service piston seat 28. The service reaction force acting through the metering spring 32, the retainer plate 33 and the driving piston 63 affords the operator a direct and accurate "feel" as to the extent or intensity of the braking effort or application.

If a greater service braking application is desired, such as for instance a dumping application wherein the available service fluid pressure at the inlet port 12 is dumped to the outlet port 13, the manually applied force is increased to move the driving piston 63 through its travel T to engage the shoulder 65 thereof with the shoulder 62 of the end housing 5 and further concertedly actuate the service piston 26 and valve member 20, as previously described, disengaging said valve member from the valve seat 11 to establish dumping pressure fluid communication between the inlet and outlet ports 12, 13. When the established fluid pressure at the outlet port 13 acting on the service piston area $A_1$ is so increased to a predetermined value, the service reaction force is correspondingly increased to effect further upward movement of the service piston 26 toward its dumping position further compressing the metering spring 32 until the service piston shoulder 31 is moved through the travel U into engagement with the retainer plate 33. Of course, during the dumping application, the established fluid pressure at the outlet port 13 is increased in excess of the predetermined value until the magnitude thereof is substantially equal to the maximum available service fluid pressure at the inlet port 12, and the service reaction force is also correspondingly increased to a maximum value; however, since the applied force necessary to maintain the driving piston shoulder 65 engaged with the end housing shoulder 62 is greater than the maximum service reaction force, further upward or reaction movement of the service piston 26 is obviated. It should be noted that the travel T of the driving piston 26 exceeds the sum of the travel U of the retainer plate between the service piston shoulder and snap ring 31, 34 and the additive travel V of the service piston valve seat 28 into engagement with the valve member 20 by the preselected amount or distance W; therefore, when the driving and service pistons 63, 26 are in their dumping positions with the driving piston shoulder 65 engaged with the end housing shoulder 62 and the service piston shoulder 31 engaged with the retainer plate 33, the valve member 20 is predeterminately maintained displaced from engagement with the valve seat 11 by the distance W in order to effect open pressure fluid communication, as opposed to metered pressure fluid communication, between the inlet and outlet ports 12, 13. With the driving and service pistons 63, 26 in their dumping positions, the service piston 28 is drivingly engaged with the driven end 57 of the emergency piston stem 56, and the emergency piston 54 is thereby driven downwardly against the differential reaction force thereacross toward engagement with the valve member 45 by the distance W; however, since the travel Y between the emergency piston seat 59 and the valve member 45 is predeterminately greater than the distance W, actuation of said valve member 45 is, of course, obviated.

Under emergency vehicle operating conditions effected in the event of a partial loss of the service fluid pressure due to leaks in the service system and/or a malfunctioning compressor (not shown) or the like, the service fluid pressure at the inlet port 12 is reduced to a magnitude less than the predetermined value, and the established service fluid pressure at the outlet port 13 is correspondingly reduced since the valve member 20 is displaced from the valve seat 11 by the distance W when the driving and service pistons 63, 26 are in their dumping positions. When the established service fluid pressure at the outlet port 13 is so reduced to a magnitude less than the predetermined value, the service reaction force is also correspondingly reduced, and the compressive force of the metering spring 32 overcomes the reduced service reaction force to drive the service piston 26 downwardly displacing the shoulder 31 thereof from the retainer plate 33. Since the driven end 57 of the emergency piston stem 56 is drivingly engaged with the service piston seat 28 when the driving and service pistons 63, 26 are in their dumping positions, as previously mentioned, the downward movement of the service piston 26 in response to the compressive force of the metering spring 32 overcomes the relatively small differential reaction force acting across the emergency piston 54 and concertedly drives said emergency piston through its travel Y to initially engage the valve seat 59 thereof with the valve member 45 closing the connecting passage 58 and isolating the emergency fluid pressure at the inlet port 40 from the established emergency fluid pressure at the outlet port 41, and further concerted downward movement of said service and emergency pistons disengages said valve member 45 from the valve seat 50 to effect metered pressure fluid communication between the established emergency fluid pressure at the outlet port 41 and the atmosphere. In this manner, the established emergency fluid pressure at the outlet port 41 flows therefrom through the emergency housing counterbore 37, the connecting passage 58 in the emergency piston 54 and the valve member exhaust passage 48 to the atmosphere to effect a metered reduction in the magnitude thereof. Of course, the metered reduction of the established emergency fluid pressure at the outlet port 41 effects a corresponding increase in the differential reaction force across the emergency piston 54, and when the differential reaction force is increased to a magnitude substantially equal to the compressive force of the metering spring 32 which effected the concerted actuation of the service and emergency pistons 26, 54, said service and emergency pistons are concertedly moved upwardly against the compressive force of said metering spring toward a position wherein the valve member 45 re-engages the valve seat 50 and is in lapped engagement with both the valve seat 50 and the emergency piston valve seat 59. Since the concerted downward movement of the service and emergency pistons 26, 54 to actuate the valve member 45 was effected by the compressive force of the metering spring 32 in response to the reduction of the established service fluid pressure at the outlet port 13 to a magnitude less than the predetermined value under emergency vehicle operating conditions and since the concerted upward or reaction movement of said service and emergency pistons to return said valve member to its lapped position was effected by the increase in the differential reaction force across said emergency piston in response to the metered reduction of the established emergency fluid presure at the outlet port 41, it is apparent that the magnitude of the reduction of the established emergency fluid pressure at the outlet port 41 is directly proportional to the magnitude of the reduction of the established service fluid pressure at the outlet port 13 less than the predetermined value when the driving piston 63 is in its fully applied or dumping position. From the foregoing, it is also apparent that the reduction of the established emergency fluid pressure at the outlet port 41 in a predetermined proportion with the reduction of the established service fluid pressure at the outlet port 13 under emergency vehicle operating conditions controls or limits the compounding or additive effects thereof on the respective service and emergency portions of the spring set brake device. In other words, when the magnitude of the service actuation of the service portion of the spring set brake device is reduced upon the reduction of the established service fluid pressure at the outlet port 13 less than the predetermined value, the magnitude of the additive or compounding actuation of the emergency portion of the spring set braking device is controllably or proportionally increased in response to the proportional reduction of the established emergency fluid pressure at the port 41. In the event of further losses in the established service fluid pressure at the outlet port 13 to magnitudes less than the predetermined value, the component parts of the control valve 1 will function in the same manner as previously described to effect proportional metered reductions in the established emergency fluid pressure at the outlet port 41 under emergency vehicle operating conditions.

In the event of a complete loss of service fluid pressure under emergency vehicle operating conditions with the driving piston 63 in its dumping position and the additive service and differential reaction forces concertedly urging the service and emergency pistons 26, 54 against the compressive force of the metering spring 32 to maintain the valve member 45 in lapped engagement with the valve seat 50, as previously described, the service reaction force is, of course, eliminated upon the complete loss of the service fluid pressure, and the compressive force of said metering spring concertedly actuates said service and emergency pistons downwardly against the differential reaction force moving the service piston snap ring 34 toward engagement with the retainer plate 33. This concerted downward movement of the service and emergency pistons 26, 54 actuates the valve member 45 from engagement with the valve seat 50 to dump the established emergency fluid pressure at the outlet port 41 to the atmosphere, as previously described, thereby eliminating the force thereof acting on the emergency piston area $A_3$. With the force of the established emergency fluid pressure at the outlet port 41 acting on the emergency piston area $A_3$ so eliminated, the differential reaction force of the emergency fluid pressure at the inlet port 40 acting on the emergency piston area $A_2$ is increased to a maximum value; however, it is contemplated that the compressive force of the metering spring 32 will be great enough to overcome the maximum differential reaction force under these conditions to maintain the valve member 45 in its dumping position disengaged from the valve seat 50.

While the travel T of the driving piston 63 is illustrated hereinabove by the engagement of the driving piston shoulder 65 with the end housing shoulder 62, it is contemplated that other travel limiting arrangements and devices may be employed in conjunction with the control valve 1, such as for instance a stop or abutment (not shown) on the control valve housing or other abutments adjacent to the treadle 67 for engagement therewith to predeterminately limit the operator actuation movement of said treadle.

From the foregoing, it is now apparent that a novel control valve 1 meeting the objects set out hereinbefore is provided and that changes or modifications as to the precise configurations, shapes and details of the construction and operation thereof set forth in the disclosure by way of illustration may be made by those skilled in the art without departing from the spirit of the invention.

The embodiments of the invention in which an exclusive property or privilege is claimed are defined as follows:

1. A control valve comprising a housing, application means movable in said housing to effect the application therethrough of supplied fluid pressure, driving means movable in said housing, resilient metering means contained in said application means and connected in force transmitting engagement between said application means and driving means, said driving means being movable in response to an applied force to concertedly urge said application means in one direction toward a position in said housing effecting the application therethrough of the supplied fluid pressure, a reaction area on said application means for subjection to the applied fluid pressure, the applied fluid pressure acting on said reaction area to establish a reaction force for moving said application means in the opposite direction against said resilient metering means and relative to said driving means in opposition to the applied force thereon, and said driving means including means for predeterminately limiting the applied force transmitted therefrom to said application means through said resilient metering means to a value not in excess of the maximum magnitude of the reaction force.

2. A control valve according to claim 1 comprising flow passage means in said housing for the application therethrough of the supplied fluid pressure, valve means movable in said housing for controlling said flow passage means, said application means including other means normally predeterminately spaced from said valve means for operative engagement therewith, said valve means being initially engaged by said other means upon the concerted applied force movement thereof with said driving means in the one direction and thereafter moved toward a position in said flow passage means establishing the application therethrough of the supplied fluid pressure, and said included means defining abutment means on said driving means for engagement with said housing to predeterminately limit the travel of said driving means in the one direction, the maximum travel of said driving means upon engagement of said abutment means with said housing being greater than the sum of the travels of said other means in the one direction into engagement with said valve means and of said application means in the other direction against said resilient metering means relative to said driving means in response to the reaction force.

3. A control valve according to claim 2, comprising means for limiting the travel of said application means in the other direction including abutment means on said application means normally predeterminately spaced from a portion of said resilient metering means for engagement therewith, said other abutment means being movable toward engagement with said portion of said resilient metering means in response to the reaction force movement of said application means in the other direction.

4. A conrol valve according to claim 1, wherein said included means comprises abutment means on said driving means movable therewith in the one direction into engagement with said housing to predeterminately limit the applied force transmitted to said application means, the applied force in excess of the maximum magnitude of the reaction force being transferred to said housing when said abutment means is engaged with said housing.

5. A control valve according to claim 4, comprising other abutment means on said housing for engagement with said first named abutment means and predeterminately spaced therefrom.

6. A control valve according to claim 5, comprising passage means in said housing for the application therethrough of the supplied fluid pressure, valve means movable in said housing for controlling said passage means, said application means including a valve control member movable in said housing for operative engagement with said valve means and normally predeterminately spaced therefrom, said reaction area being on said valve control member, and said resilient metering means being contained in said valve control member, said valve means being initially engaged by said valve control member upon the concerted applied force movement thereof with said driving means in the one direction and thereafter urged toward a position in said passage means establishing the application therethrough of the supplied fluid pressure, said valve control member being movable in the other direction against said resilient metering means and relative to said driving means in response to the reaction force acting thereon, and means for limiting the movement of said valve control member in the other direction including an abutment portion on said resilient metering means engaged with said driving means, and an abutment on said valve control member normally predeterminately spaced from said abutment portion for engagement therewith, said abutment being movable toward engagement with said abutment portion in response to the reaction force movement of said valve control member in the other direction, and the travel of said first named abutment means into engagement with said other abutment means being greater than the sum of the travels of said valve control member in the one direction into engagement with said valve means and of said abutment in the other direction into engagement with said abutment portion.

7. A control valve according to claim 6, comprising another abutment on said valve control member predeterminately spaced from said first named abutment, said resilient metering means including retainer means movable in said valve control member between said first named and other abutments and connected in force transmitting engagement with said driving means, said abutment portion being on said retainer means, and spring means caged between said valve control member and said retainer normally urging said retainer means into displacement preventing engagement with said other abutment, said other abutment beign disengaged from said retainer means and said first named abutment being urged toward engagement with said abutment portion upon the reaction force movement of said valve control member against said spring means relative to said driving means and retainer means.

8. A control valve according to claim 4, wherein said application means is urged in the one direction toward its position establishing the applied fluid pressure in response to the force of said resilient metering means in the event of at least a partial failure of the applied fluid pressure reducing the magnitude of the reaction force to a value less than the maximum magnitude thereof when said abutment means is engaged with said housing, other application means movable in said housing and normally effecting the application therethrough of other supplied fluid pressure, means for force transmitting engagement between said first named and other application means responsive to the resilient metering means movement of said first named application means to concertedly drive said other application means in the one direction toward a position in said housing isolating the other supplied fluid pressure from the other applied fluid pressure and venting the other applied fluid pressure to the atmosphere, and opposed areas on said other application means for respective subjection to the other supplied and applied fluid pressures, said opposed areas being respectively responsive to the isolated other supplied fluid pressure and the reduced other applied fluid pressure to establish another reaction force transmitted through said force transmitting means to said first named application means for addition to the reduced first named reaction force and having a magnitude substantially equal to the reduction in the magnitude of the reduced first named reaction force.

9. A control valve according to claim 8, comprising flow passage means in said housing for the application therethrough of the other supplied fluid pressure, valve means movable in said flow passage and normally urged toward a position isolating the established other applied fluid pressure from the atmosphere, said other application means including a valve control member movable in said housing for operative engagement with said valve means and defining a portion of said flow passage means, and said opposed areas being on said valve control members and one of said areas subjected to the other supplied fluid pressure being predeterminately greater than the other of said areas subjected to the other applied fluid pressure, said valve control member being driven in the one direction by said force transmitting means in response to the resilient metering means movement of said first named application means to initially engage said valve means isolating the other supplied fluid pressure from the other applied fluid pressure and thereafter move said valve means toward a position metering the other applied fluid pressure to the atmosphere to effect a metered reduction thereof in a predetermined proportion to the reduction of the first named applied fluid pressure in the event of the partial failure thereof, and the isolated other supplied fluid pressure and the reduced other applied fluid pressure acting on said other area to establish the other reaction force.

10. A control valve according to claim 8, comprising flow passage means in said housing for the first named supplied and applied fluid pressures, valve means movable in said housing and controlling said flow passage means, said first named application means including a valve control member movable in said housing for operative engagement with said valve means and normally predeterminately spaced therefrom, said reaction area being in said valve control member, and a pair of spaced abutments on said valve contol member, said resilient metering means including retainer means movable between said abutments and connected in force transmitting engagement with said driving means, and spring means caged between said valve control member and said retainer means normally urging said retainer means into displacement preventing engagement with one of said abutments, said valve means being initially engaged by said valve control member upon the concerted applied force movement thereof with said driving means in the one direction and thereafter urged toward a position in said flow passage means establishing the application therethrough of the first named applied fluid pressure, said valve control member being movable in the other direction against the force of said spring means and relative to said driving means and retainer means to move the other of said abutments toward engagement with said retainer means in response to the first named reaction force of the first named applied fluid pressure acting on said first named area, and the maximum travel of said driving means upon the engagement of said abutment means with said housing being greater than the sum of the travels of said valve control member into engagement with said valve means and said other abutment into engagement with said retainer means.

References Cited

UNITED STATES PATENTS

| | | | |
|---|---|---|---|
| 3,309,149 | 3/1967 | Bueler | 303—13 |
| 3,366,424 | 1/1968 | Edwards | 303—52 |

MILTON BUCHLER, Primary Examiner

J. J. McLAUGHLIN, Jr., Assistant Examiner

U.S. Cl. X.R.

91—434; 137—627.5; 303—9, 13, 52, 56